United States Patent
Matsui et al.

(10) Patent No.: US 6,748,980 B2
(45) Date of Patent: Jun. 15, 2004

(54) BASE FABRIC FOR HOLLOW-WOVEN AIR BAG AND AIR BAG

(75) Inventors: Mariko Matsui, Ohtsu (JP); Mamoru Kitamura, Ohtsu (JP); Takahiro Kuramoto, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 172 days.

(21) Appl. No.: 10/006,960

(22) Filed: Dec. 5, 2001

(65) Prior Publication Data
US 2002/0130503 A1 Sep. 19, 2002

(30) Foreign Application Priority Data

Dec. 11, 2000 (JP) .................................... 2000-376389
Jan. 29, 2001 (JP) .................................... 2001-020575
Mar. 5, 2001 (JP) .................................... 2001-060472

(51) Int. Cl.⁷ ................................................ D03D 3/00
(52) U.S. Cl. .................. 139/384 R; 139/387 R; 139/389; 139/408; 139/410; 139/414; 139/420 A
(58) Field of Search ........................ 139/383 R, 384 R, 139/387 R, 389, 390, 407, 408, 48, 50, 384, 414, 420 A, 410; 428/34.3, 34.5, 34.6, 35.7, 35.9, 36.1, 101, 116, 166; 442/104, 149, 164, 168, 203, 205, 206, 207, 218, 220, 234, 236, 286, 76, 208; 383/3; 280/743.1

(56) References Cited

U.S. PATENT DOCUMENTS 5,865,464 A * 2/1999 Kanuma et al. ......... 280/743.1
6,220,309 B1 * 4/2001 Sollars, Jr. ................. 139/389
6,488,311 B2 * 12/2002 Kato et al. ............... 280/743.1
6,595,244 B1 * 7/2003 Sollars, Jr. ................. 139/389

FOREIGN PATENT DOCUMENTS

JP        4 193646        7/1992

* cited by examiner

Primary Examiner—Arti R. Singh
(74) Attorney, Agent, or Firm—Leydig, Voit & Mayer, Ltd.

(57) ABSTRACT

A base fabric for a hollow-woven air bag, including: a bag portion (multiple fabric portion) formed by connecting a plurality of cloth pieces by hollow weaving; a fastened portion A connected to the bag portion (multiple fabric portion); and a fastened portion B of a weave structure different from that of the fastened portion A, which is formed in a boundary portion between the bag portion (multiple fabric portion) and the fastened portion A.

22 Claims, 8 Drawing Sheets

BASE FABRIC FOR HOLLOW-WOVEN AIR BAG AND AIR BAG

BACKGROUND OF THE INVENTION

1. Field of the Invention

The present invention relates to a technique of an air bag as one of safety devices for a vehicle and, more particularly, a technique of an air bag useful to protect a passenger in a transport vehicle from a front or side impact.

2. Description of the Related Art

In recent years, the installation rate of an air bag as one of safety parts for a vehicle is rapidly increasing in association with growing awareness of safety of an occupant. An air bag is useful to protect an occupant by sensing an impact by a sensor at the time of a collision of the vehicle, generating high-temperature and high-pressure gas from an inflator, and deploying the air bag rapidly.

Conventionally, air bags for protecting an occupant at the time of a collision from a front impact are installed for a driver side and a passenger side. Recently, an air bag capable of dealing with an impact from a side has been developed. An air bag for each of the driver's side and the passenger side is conventionally manufactured by sewing two base fabrics for an air bag. However, recently, for improvement in performance of an air bag and reduction in manufacturing cost, attention has been being paid to a hollow weaving technique capable of forming a bag at a weaving stage.

In many cases, an air bag for side-impact protection is designed in consideration of roll over of a vehicle. Different from the air bags for the driver side and the passenger side, it is necessary to assure internal pressure holding time of several seconds to about ten seconds after deployment. It is designed so that the head of an occupant can be protected even during roll over of a vehicle. Consequently, a gas leak from the woven fabric body (hereinbelow, also called "air leak") has to be prevented. A sewn product is not practical since an air leaks from a seam. Under present circumstances, the surface of a base fabric for a hollow-woven air bag is usually coated.

In the case of hollow-woven air bags for the driver side and passenger side, it is unnecessary to bold the internal pressure for several seconds to about 10 seconds, so that an uncoated fabric is usually used to realize light weight and compactness. For this purpose, a high-density woven fabric of low permeability is necessary. All of hollow-woven air bags for driver side, passenger side, and side-impact protection have a big problem such that, when the air bag is inflated, air leaks from deviation in a boundary portion between a single layer that is interwoven by the same yarn (fastened portion) and a bag portion and residuals jump out from the inflator. In order to solve the problem, a high-density woven fabric is necessary as a material.

Moreover, at the present stage, in many cases, a side-impact protection hollow-woven air bag base fabric is designed in consideration of roll over of a vehicle, and an air bag obtained by coating the surface of the hollow-woven air bag base fabric to improve the internal pressure holding performance of the bag is used. However, a base fabric for an air bag having the internal pressure holding performance resistive to roll over of a vehicle does not exist conventionally.

For example, Japanese Unexamined Patent Application No. Hei-4-193646 discloses a technique of dividing a single structure that is interwoven by the same yarn of the hollow-woven air bag into the inner side and the outer side and applying weave structures of different restraints of warps and wefts to the inner and outer sides. However, the difference of restraints between the inner and outer sides is not defined, and the proposal does not sufficiently obtain the inner pressure holding performance requested at the time of deployment of the air bag.

SUMMARY OF THE INVENTION

Paying attention to the problems of the conventional base fabric for a hollow-woven air bag and, particularly, improvement in the internal pressure holding performance, an object of the present invention is to provide a base fabric for a hollow-woven air bag which solves the problem of air leak from the boundary between a bag portion and a fastened portion.

A base fabric for a hollow-woven air bag according to the invention is characterized by comprising:

- a bag portion (multiple fabric portion) formed by connecting a plurality of cloth pieces by hollow weaving;
- a fastened portion A connected to the bag portion (multiple fabric portion); and
- a fastened portion B of a weave structure different from that of the fastened portion A, which is formed in a boundary portion between the bag portion (multiple fabric portion) and the fastened portion A.

With the configuration, by inserting a special structure band to the boundary portion between the bag portion and the fastened portion A, the deviation in the boundary portion when the air bag is expanded is reduced, leak of gas generated from the inflator can be prevented with reliability, and the improved internal pressure holding performance of the air bag can be accordingly achieved. As a result, the base fabric for a hollow-woven air bag capable of solving the problem of air leak from the boundary portion between the bag portion and the fastened portion can be provided.

Preferably, the fastened portion B has 1 to 20 warps and/or wefts.

With the configuration, the air leak from the fastened portion B as the boundary portion between the bag portion and the fastened portion is further prevented.

Preferably, the weave structure of the fastened portion B is that warps and/or wefts of at least one line existing in the boundary face with the bag portion are interlaced in the order opposite to that of the end line of the bag portion.

Preferably, the weave structure of the fastened portion B is that warps and/or wefts of at least one line existing in the boundary face with the fastened portion A are interlaced in the order opposite to that of the end line of the fastened portion A.

According to the invention, there is also provided a base fabric for a hollow-woven air bag, comprising

- a bag portion (multiple fabric portion) formed by connecting a plurality of cloth pieces each made by warps and wefts by hollow weaving,
- wherein a rate of variation in a crimp ratio of all of the warps is 40% or less.

With the configuration, the rate of variation in the crimp ratio between the warps in the portions of different weave structures is low. Consequently, occurrence of loosening of the warps during weaving can be suppressed, improved weaving performance can be accordingly obtained, and the base fabric of high quality is obtained. In the case of coating the surface of the base fabric, uniform coating is performed, and improved internal pressure holding performance of the air bag can be achieved.

Preferably, a rate of variation in thickness in the width direction of the base fabric for an air bag is 3% or less.

With such a configuration, flatness of the base fabric is achieved and the number of defects caused by a crease decreases. Further, since the flatness of the base fabric is obtained, post-treatment is excellently performed. Even in the case where coating is necessary in post-treatment, since the ability of coating is good, the internal pressure holding performance of the air bag can be further improved.

Preferably, a rate of variation in a crimp ratio of all of the warps is 30% or less, more preferably, 15% or less, and most preferably, 10% or less.

According to the invention, there is also provided an air bag comprising a base fabric for an air bag for forming a bag portion, and an inflator attaching port provided for the bag portion, wherein the base fabric for an air bag comprises:

the bag portion (multiple fabric portion) formed by connecting a plurality of cloth pieces by hollow weaving;

a fastened portion A connected to the bag portion (multiple fabric portion); and a fastened portion B of a weave structure different from that of the fastened portion A, which is formed in a boundary portion between the bag portion (multiple fabric portion) and the fastened portion A.

With the configuration, the air bag solving the problem of the air leak from the boundary portion between the bag portion and the fastened portion can be provided.

Alternately, the air bag may be constructed by comprising a base fabric for an air bag for forming a bag portion and an inflator attaching portion provided for the bag portion, and the base fabric for an air bag has the bag portion (multiple fabric portion) formed by connecting a plurality of cloth pieces each made by warps and wefts by hollow weaving, and a rate of variation in a crimp ratio of all of the warps is 40% or less.

With the configuration as well, the base fabric of high quality with improved internal pressure holding performance of the air bag can be obtained.

According to the invention, there is also provided a side-impact protection air bag comprising:

a base fabric for an air bag for forming a bag portion; and an inflator attaching port provided for the bag portion, wherein the base fabric for an air bag comprises the bag portion (multiple fabric portion) formed by connecting a plurality of cloth pieces made by warps and wefts by hollow weave, and a rate of variation in crimp ratio of all of the warps is 40% or less.

Since the rate of variation in the crimp ratio between warps in portions of different weave structures is low, occurrence of loosening of warps during weaving can be suppressed, the weaving performance is improved, and the base fabric of high quality is achieved. Consequently, the side-impact protection hollow-woven air bag of high quality with improved internal pressure holding performance of the air bag can be obtained.

Preferably, a rate of variation in thickness in the width direction of the base fabric for an air bag is 3% or less.

With the configuration, the weaving performance is improved and a rate of variation in thickness in the width direction of the base fabric is low. Thus, the flatness of the base fabric is achieved, the number of defects such as a crease decreases, and post-treatment can be excellently performed. Also in the case where coating is necessary in post-treatment, coatability thereof can be performed more excellently.

DETAILED DESCRIPTION OF THE PREFERRED EMBODIMENTS

As materials of fibers for manufacturing a base fabric for a hollow-woven air bag of the invention, aliphatic polyamide fibers of nylon 66, nylon 6, nylon 46, nylon 12, and the like, aromatic polyamide fibers such as aramid fibers, and homopolyester fibers of polyethylene terephthalate, or polybutylene terephthalate are particularly suitably used but the invention is not limited to the materials. Other than the above, aromatic polyester fibers, ultrahigh molecular weight polyethylene fibers, PPS fibers, polyether ketone fibers, and the like can be used. In consideration of economical efficiency, polyester fibers and polyamide fibers (nylon 66, nylon 6, and nylon 46) are especially preferable.

In order to improve processing in a raw filament manufacturing process and a post-treatment process, the above synthetic fibers may contain various additives. Examples of various additives are antioxidant, thermostabilizing agent, smoothing agent, antistatic agent, thickener, and frame retarder.

Coating agents for preventing deterioration in air permeability and deviation in seam are not particularly limited. A synthetic rubber made of chloroprene, chlorosulphonated olefin, or silicone may be applied or a synthetic rubber in a rubber state may be laminated, as necessary, via an adhesive. As long as the performance of the air bag is satisfied, the base fabric does not have to be subjected to coating or laminating but may be uncoated. An uncoated base fabric may be subjected to a post-treatment (including a resin treatment).

A loom used at the time of weaving is not also particularly limited. For example, a water jet loom, an air jet loom, a rapier loom, or a projectile loom is used. In consideration of weave productivity, damage on warp, yarn contamination, and the like, the water jet loom and air jet loom are particularly preferable.

At the time of determining the pattern of hollow weaving, a jacquard machine or a dobby machine is used. Particularly, in order to form a complicated pattern, a jacquard machine (of an electronic or mechanical type) is necessary. Further, because of high productivity and easy change in pattern, the electronic type jacquard machine is preferable.

Preferred examples of a base fabric for a hollow-woven air bag and the hollow-woven air bag using the fabric of the invention will be described in detail hereinbelow with reference to the attached drawings.

Figure 1:
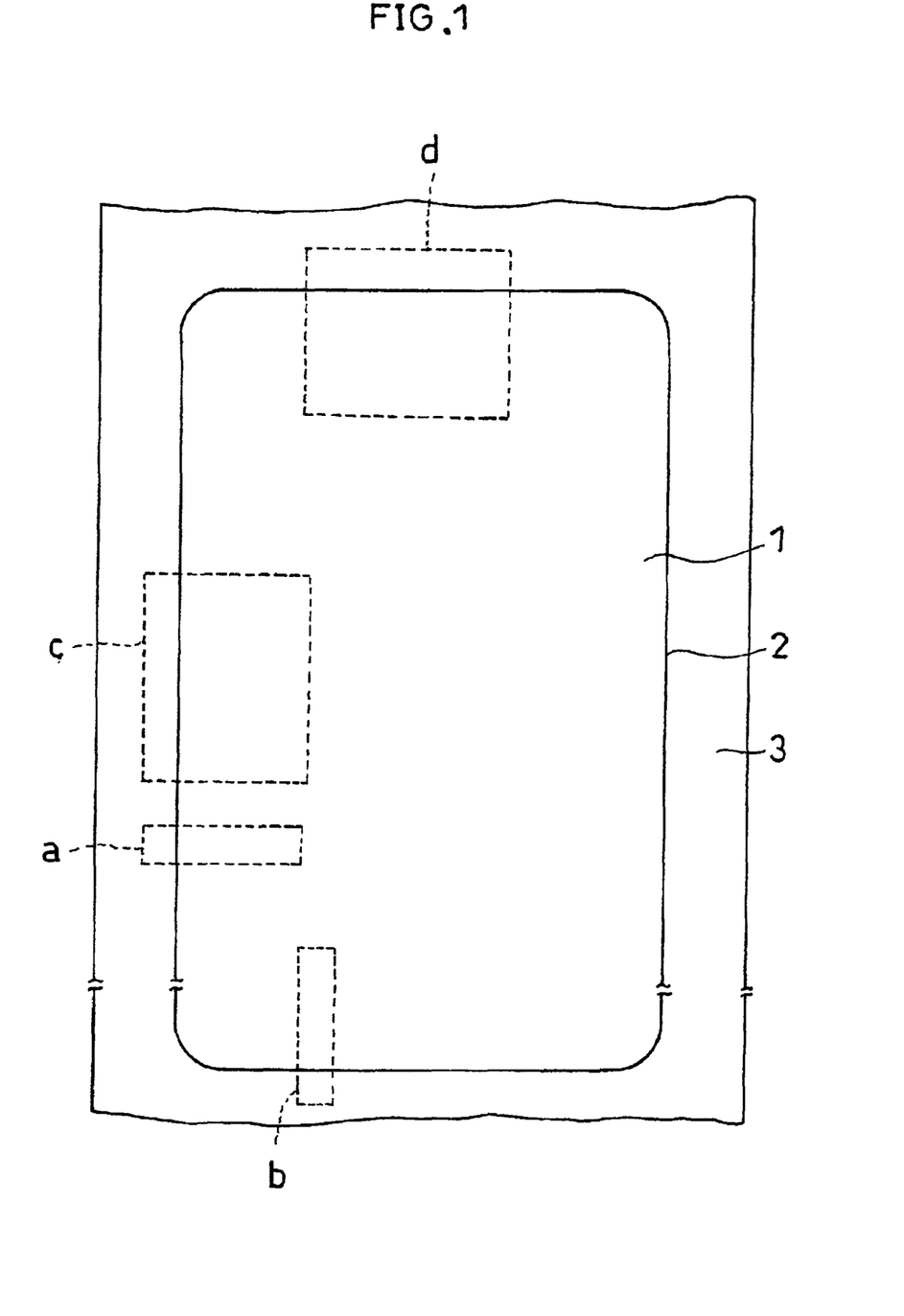
FIG. 1 is a plan view showing an embodiment of a base fabric for a hollow-woven air bag according to the invention.

FIG. 1 is a plane view schematically showing the structure of a hollow-woven air bag used. In the hollow-woven air bag shown in FIG. 1, to avoid complication, an inflator attaching port and a complicated shape of a bag are not shown. In FIG. 1, reference numeral 1 denotes a hollow-woven portion (multiple fabric portion), 2 indicates a fastened portion B and 3 denotes a fastened portion A.

Figure 2:
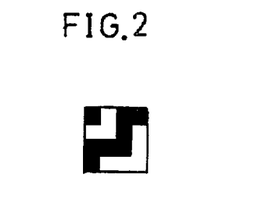
FIG. 2 is a diagram showing the structure of a double hollow-woven portion as a part of the base fabric for a hollow-woven air bag in FIG. 1.

The hollow-woven portion 1 takes the form of a double-woven bag. FIG. 2 shows an example of the structure of a double-woven fabric. The hollow-woven portion 1 may employ bag structures other than the double weaving.

Figure 3:
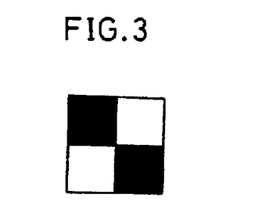
FIG. 3 is a diagram showing the structure of a fastened portion A as a part of the base fabric for the hollow-woven air bag in FIG. 1.

FIG. 3 shows an example of the fastened portion A (3 in FIG. 1). As long as a fastened portion can be formed, any structure other than the structure of the boundary portion (fastened portion B) can be also used. The fastened portion B (2 in FIG. 1) corresponds to the boundary portion with the bag portion. Desirably, the fastened portion B (2 in FIG. 1) has a structure that warps and wefts are interlaced in the order opposite to that of the end line of the bag portion. Specifically, a line has a structure that warps and wefts are interlaced in the order opposite to that of the end line of the bag portion, and the next line has a structure that warps and wefts are interlaced in the order opposite to that of the preceding line, and/or desirably, the fastened portion B (2 in FIG. 1) has a structure that warps and wefts are interlaced in the order opposite to that of the end line of the fastened portion A. Specifically, a line has a structure that warps and wefts are interlaced in the order opposite to that of the end line of the fastened portion A, and the next line has a structure that warps and wefts are interlaced in the order opposite to that of the preceding line.

The fastening portion B has, preferably, 1 to 20 warps and/or wefts and yarns perpendicularly crossing inserted yarns are adjusted according to the weave density. In consideration of the quality of the air bag including warp tension and crimp caused by warp, more preferably, 1 to 10 yarns, and further more preferably, 1 to 5 yarns are inserted, and yarns perpendicularly crossing the inserted yarns are adjusted according to the weave density.

EXAMPLES

The invention will be described more specifically hereinbelow by concrete examples. The following examples and comparative examples were evaluated by the following methods.

Opening at the Margin Between the Single Layer and Double Layer

An opening at the margin between the single layer and double layer was measured in conformity with JIS-L1096-6.21.1. Specifically, a sample including the fastened portion B (2 in FIG. 1) as a boundary between the bag portion (1 in FIG. 1) and the fastened portion A (3 in FIG. 1) is cut out and stretched under the following conditions by a tensile tester, and the opening at the margin between the single layer and double layer at that time is measured.

(1) Samples are cut out (shown by dotted lines a and b in FIG. 1) so that width is 3 cm, length between chucks is 15 cm, and the fastening portion B is at the right angle to the stretching direction. The samples are set so that he fastened portion B is in the center in the length direction between the chucks.

(2) A tensile tester is used to stop a tension at speed of testing rate of stressing of 5 cm/min and with a load of 294N, and the distance between both edges of the portion stretched at the maximum in a sample stressed state is measured by using a caliper or a measurer.

(3) Warp and weft are measured five times each and an average value of the total ten measurement values is used as an opening at the margin between the single layer and double layer value.

Air Permeability

A high-pressure permeability measurer is used, a differential pressure applied on a sample fabric is set to 50 kPa, and a flow rate ($L/cm^2/min$) of air from the sample fabric under the differential pressure of 50 kPa is measured. Since a measurement face is of a circle shape having the diameter of 10 cm, in the case where the direction having the fastened portion B of the sample fabric is used as a vertical direction, a sample fabric of 15 cm in the vertical direction and 7.5 cm in the lateral direction (only the bag portion) is cut out (dotted line c, d in FIG. 1), the bag portion is opened with respect to the fastened portion B as a center, and the resultant is set as a sample fabric on the measurement face. Warp and weft are measured five times each, and an average value of total ten measurement values is used as an air permeability value.

The Quality of the Air Bag

In consideration of defects and crimp caused by warp of a finished base fabric for a hollow-woven air bag and a finished hollow-woven air bag, evaluation is made as very good, good, so—so, and bad.

Example 1

Figure 4:
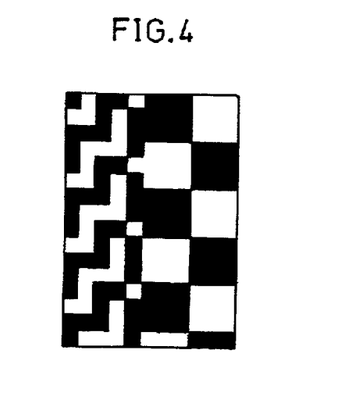
FIG. 4 is a diagram showing the structure of a fastened portion B used in Example 1.

Nylon 66 filament yarns of 35(D dtex/108f were used as warps and wefts to form the portion 1 in FIG. 1 by plain weave by employing an air jet loom and an electronic jacquard machine so as to form a double bag portion having 60 warps/2.54 cm and 60 wefts/2.54 cm by hollow weave. After that, the resultant woven fabric was subjected to a boiling water shrinking process and, subsequently, drying and setting processes, thereby forming a finished fabric. In the border portion 2 in FIG. 1 of the sample, one line of warps and wefts interlaced in the order opposite to that of the end line of the bag portion (double portion) was inserted. FIG. 4 shows an example of the structure of 3 (fastened portion B) in FIG. 1 at this time.

Example 2

Figure 5:
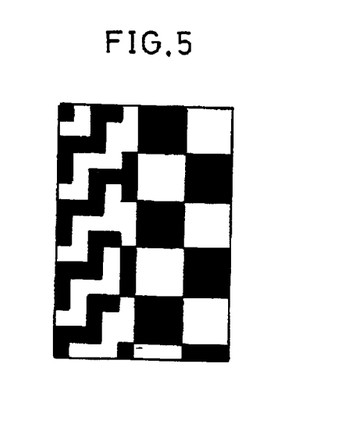
FIG. 5 is a diagram showing the structure of a fastened portion B used in Example 2.

Nylon 66 filament yarns of 350 dtex/108f were used as warps and wefts to form the portion 1 in FIG. 1 by plain weave by employing an air jet loom and an electronic jacquard machine so as to form a double bag portion having 60 warps/2.54 cm and 60 wefts/2.54 cm by hollow weave. After that, the resultant woven fabric was subjected to a boiling water shrinking process and, subsequently, drying and setting processes, thereby forming a finished fabric. In the border portion 2 in FIG. 1 of the sample, one line of warps and wefts interlaced in the order opposite to that of the end line of the fastened portion A was inserted. FIG. 5 shows an example of the structure of 3 (fastened portion B) in FIG. 1 at this time.

Example 3

Figure 6:
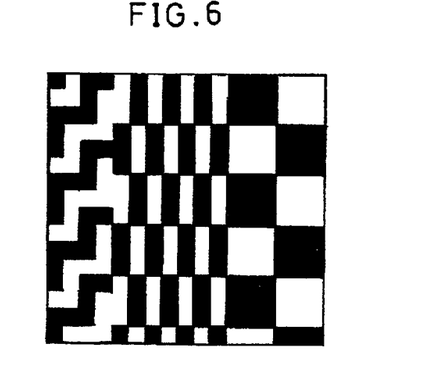
FIG. 6 is a diagram showing the structure of a fastened portion B used in Example 3.

Nylon 66 filament yarns of 350 dtex/108f were used as warps and wefts to form the portion 1 in FIG. 1 by plain weave by employing an air jet loom and an electronic jacquard machine so as to form a double bag portion having 60 warps/2.54 cm and 60 wefts/2.54 cm by hollow weave. After that, the resultant woven fabric was subjected to a boiling water shrinking process and, subsequently, drying and setting processes, thereby forming a finished fabric. In the border portion 2 in FIG. 1 of the sample, seven lines of warps and wefts interlaced in the order opposite to that of the end line of the fastened portion A were inserted. FIG. 6 shows an example of the structure of 3 (fastened portion B) in FIG. 1 at this time.

Example 4

Figure 7:
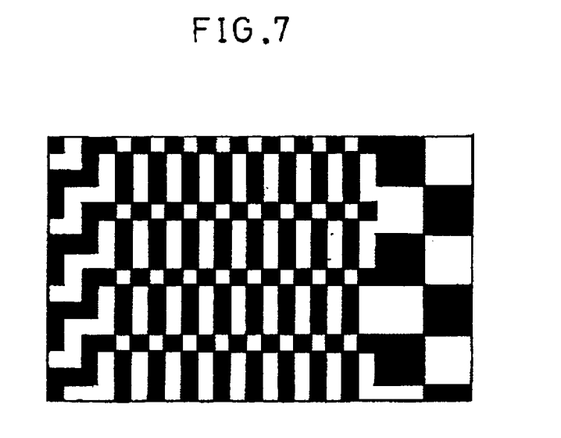
FIG. 7 is a diagram showing the structure of a fastened portion B used in Example 4.

Nylon 66 filament yarns of 350 dtex/108f were used as warps and wefts to form the portion 1 in FIG. 1 by plain weave by employing an air jet loom and an electronic jacquard machine so as to form a double bag portion having 60 warps/2.54 cm and 60 wefts/2.54 cm by hollow weave. After that, the resultant woven fabric was subjected to a boiling water shrinking process and, subsequently, drying and setting processes, thereby forming a finished fabric. In the border portion 2 in FIG. 1 of the sample, eight lines of warps and wefts interlaced in the order opposite to that of the end line of the bag portion (double portion) and eight lines of warps and wefts interlaced in the same order as that of the end line of the bag portion (double portion) were alternately inserted. FIG. 7 shows an example of the structure of 3 (fastened portion B) in FIG. 1 at this time.

Comparative Example 1

Figure 8:
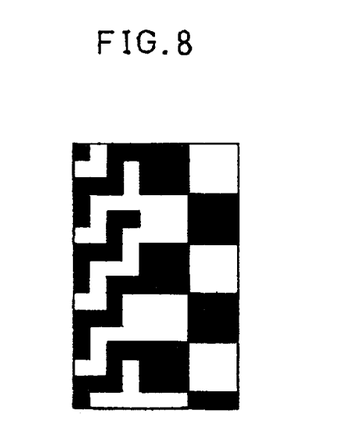
FIG. 8 is a diagram showing the structure of a fastened portion B used in Comparative Example 1.

Nylon 66 filament yarns of 350 dtex/108f were used as warps and wefts to form the portion 1 in FIG. 1 by plain weave by employing an air jet loom and an electronic jacquard machine so as to form a double bag portion having 60 warps/2.54 cm and 60 wefts/2.54 cm by hollow weave. After that, the resultant woven fabric was subjected to a boiling water shrinking process and, subsequently, drying and setting processes, thereby forming a finished fabric. In the sample, the border portion 2 in FIG. 1 was not formed, and a structure that the bag portion is directly connected to the fastened portion A (3 in FIG. 1) was obtained. FIG. 8 shows an example of the structure of 3 (fastened portion B) in FIG. 1 at this time.

Comparative Example 2

Figure 9:
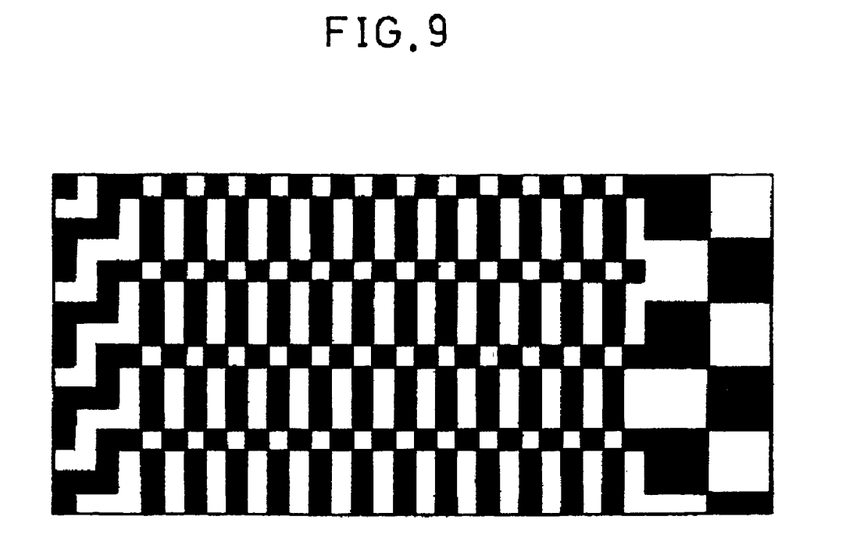
FIG. 9 is a diagram showing the structure of a fastened portion B used in Comparative Example 2.

Nylon 66 filament yarns of 350 dtex/108f were used as warps and wefts to form the portion 1 in FIG. 1 by plain weave by employing an air jet loom and an electronic jacquard machine so as to form a double bag portion having 60 warps/2.54 cm and 60 wefts/2.54 cm by hollow weave. After that, the resultant woven fabric was subjected to a boiling water shrinking process and, subsequently, drying and setting processes, thereby forming a finished fabric. In the border portion 2 in FIG. 1 of the sample, 12 lines of warps and wefts interlaced in the order opposite to that of the end line of the bag portion (double portion) and 12 lines of warps and wefts interlaced in the same order as that of the end line of the bag portion were alternately inserted. FIG. 9 shows an example of the structure of 3 (fastened portion B) in FIG. 1 at this time.

Comparative Example 3

Figure 10:
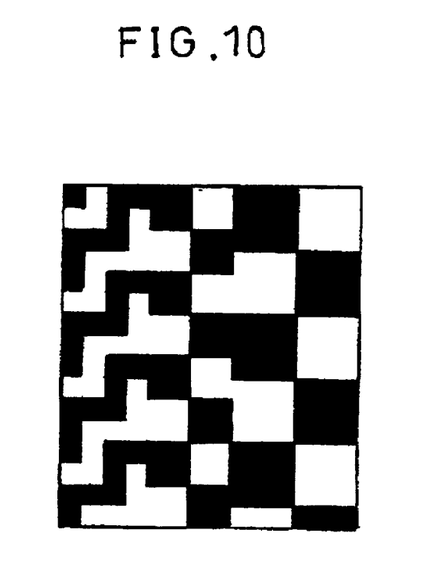
FIG. 10 is a diagram showing the structure of a fastened portion B used in Comparative Example 3.
Figure 11:
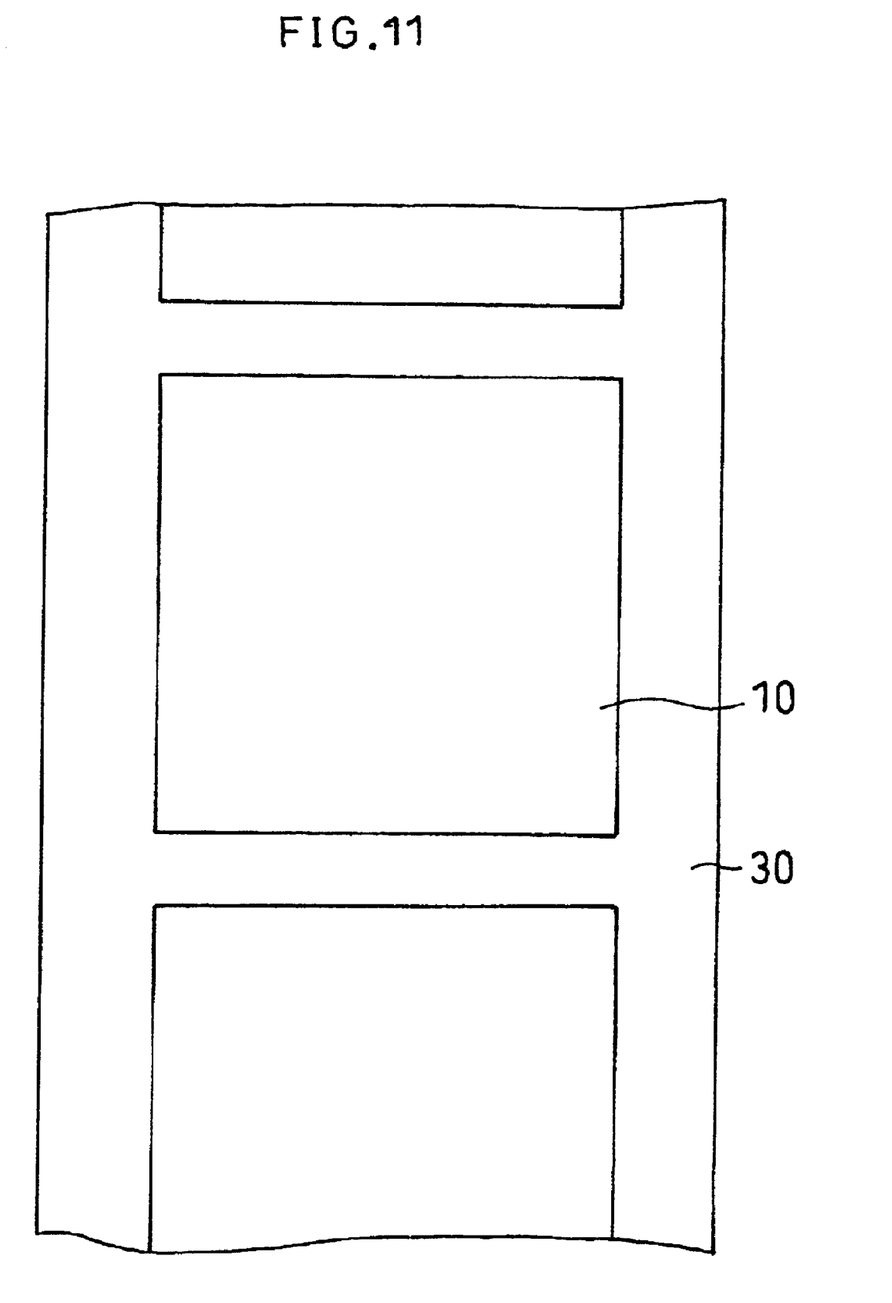
FIG. 11 is a plane view of a base fabric for a hollow-woven air bag according to another embodiment.

Nylon 66 filament yarns of 350 dtex/108f were used as warps and wefts to form the portion 1 in FIG. 1 by plain weave by employing an air jet loom and an electronic jacquard machine so as to form a double bag portion having 60 warps/2.54 cm and 60 wefts/2.54 cm by hollow weave. After that, the resultant woven fabric was subjected to a boiling water shrinking process and, subsequently, drying and setting processes, thereby forming a finished fabric. In the border portion 2 in FIG. 1 of the sample, one line (consists of four yarns) of a basket of 2×2 used in the first embodiment of Japanese Unexamined Patent Application No. 4-193646 was inserted. FIG. 10 shows an example of the structure of 3 (fastened portion B) in FIG. 1 at this time.

Table 1 shows results of evaluation of the properties of the above examples and comparative examples.

TABLE 1

| | Opening at the margin between the single layer and double layer (mm) | Quantity of airflow (L/cm$^2$/min) | Quality of bag |
|---|---|---|---|
| Example 1 | 2.2 | 4.2 | very good |
| Example 2 | 2.4 | 4.4 | very good |
| Example 3 | 2.3 | 4.4 | good |
| Example 4 | 2.2 | 4.2 | good |
| Comparative Example 1 | 3.1 | 6.0 | very good |
| Comparative Example 2 | 2.2 | 4.2 | bad |
| Comparative Example 3 | 3.0 | 5.8 | good |

From Table 1, it is understood that, in the case of Examples 1, 2, 3, and 4, the opening at the margin between the single layer and double layer is small and the quantity of airflow is also small. When the air bags are inflated, air leak from the fastened portion B as the boundary between the bag portion and the fastened portion A decreases.

In Examples 1 and 2, the number of warps and/or wefts in the border portion is small, so that uniform thickness of the bag is achieved, and the quality of the bag obtained is very good.

In Examples 3 and 4, the number of warps and/or wefts in the border portion between the bag portion and the fastened portion A is larger as compared with Examples 1 and 2, so the uniformity in thickness of the bag is slightly lower. However, it is not so bad since the border portion does not make defects such as a crease worse and the quality of the bag is good.

In Comparative Example 1, since the border portion does not exist, the uniform thickness of the bag is obtained and the quality of the bag is very good. However, since the bag portion and the fastened portion A are directly connected to each other, the opening at the margin between the single layer and double layer in the portion is large and the quantity of airflow is large. Consequently, when an air bag is inflated, air fiercely leaks from the border between the bag portion and the fastened portion A and the performance of the air bag cannot be displayed.

In Comparative Example 2, since the warps and/or wefts are inserted to the border portion between the bag portion and the fastened portion A more than necessary, although values of the opening at the margin between the single layer and double layer in the boundary portion and the quantity of airflow are small, uniform thickness of the bag cannot be obtained. Uneven thickness causes a crease and the quality of the bag obtained is very bad.

In Comparative Example 3, as described in the embodiment of Japanese Unexamined Patent Application No. 4-193646, the structure which is more restrained as compared with the fastened portion A is inserted to the fastened portion B. However, as a result, even with such higher restraint, the elongation amount when the bag is inflated and air leak from the portion are not satisfactory. Specifically, the structure is not a structure that warps and/or wefts of at least one line existing in the boundary face with the bag portion are interlaced in the order opposite to that of the end line of the bag portion and/or a structure that warps and/or wefts of at least one line are interlaced in the order opposite to that of the end line of the fastened portion A. Consequently, a problem such as float yarn which occurs in the boundary portion between the bag portion and the fastened portion cannot be solved, the elongation of the boundary portion is large, and the performance of the bag obtained finally is low.

ANOTHER EMBODIMENT OF THE INVENTION

A side-impact protection hollow-woven air bag using the base fabric of the invention will now be described.

Figure 12:
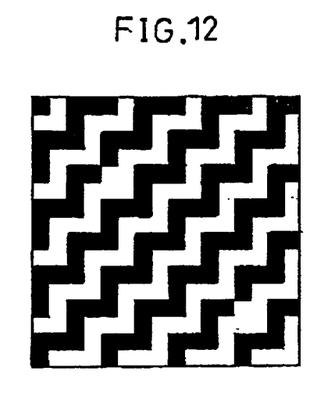
FIG. 12 is a diagram showing the structure of a fastened portion B used in Example 5.
Figure 13:
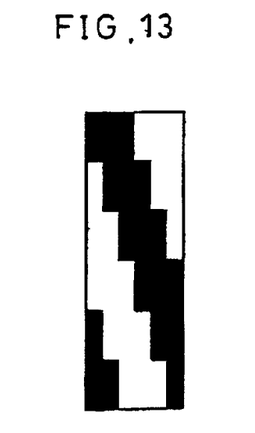
FIG. 13 is a diagram showing the structure of a fastened portion B used in Example 6.
Figure 14:
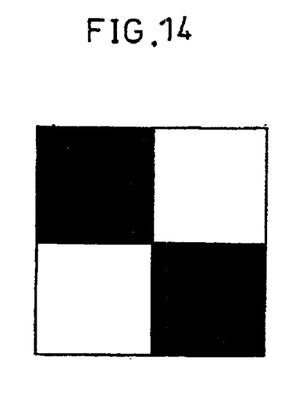
FIG. 14 is a diagram showing the structure of a fastened portion B used in Example 7.
Figure 15:
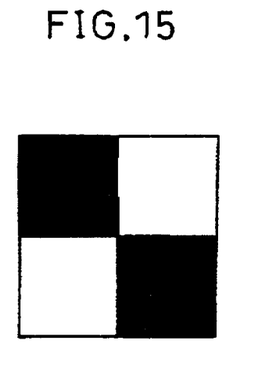
FIG. 15 is a diagram showing the structure of a fastened portion B used in Example 8.
Figure 16:
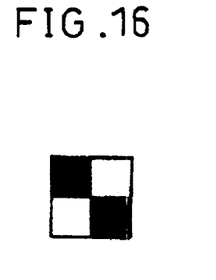
FIG. 16 is a diagram showing the structure of a fastened portion B used in Comparative Example 4.
Figure 17:
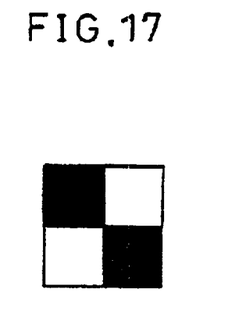
FIG. 17 is a diagram showing the structure of a fastened portion B used in Comparative Example 5.
Figure 18:
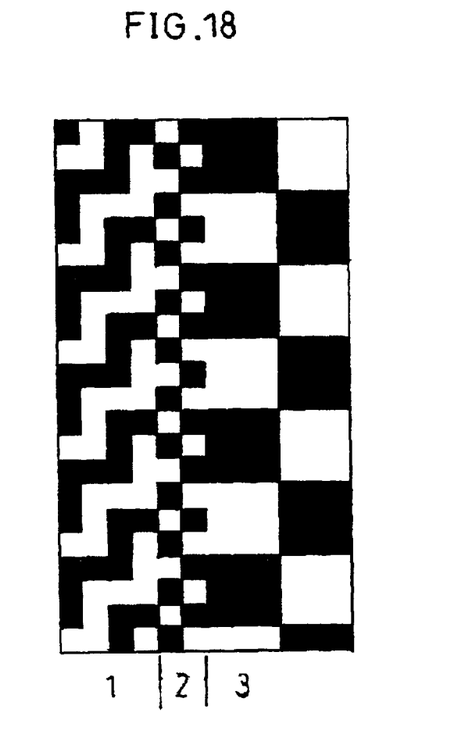
FIG. 18 is a diagram showing the structure of a fastened portion B used in Example 9.
Figure 19:
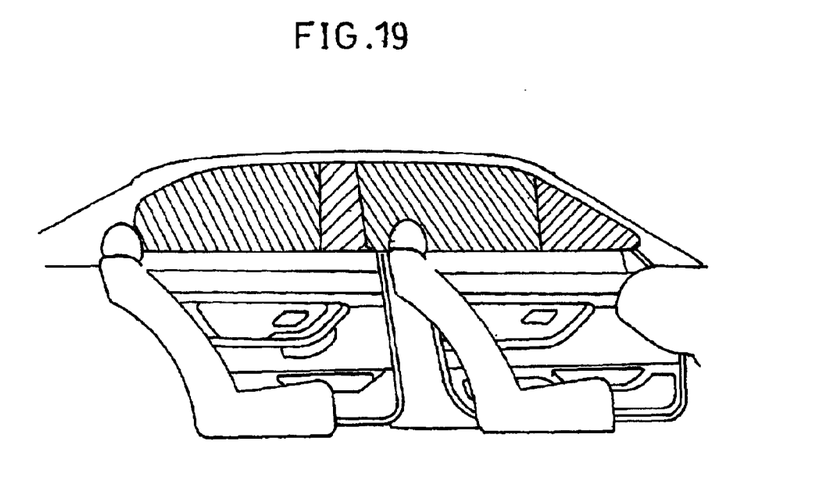
FIG. 19 is a front view showing an example where a side-impact protection hollow-woven air bag is attached to a vehicle body.

The base fabric for the side-impact protection hollow-woven air bag was formed in the shape shown in FIG. 12. Reference numeral 10 denotes a bag portion (double fabric portion) and reference numeral 30 indicates a fastened portion. In a manner similar to FIG. 1, to omit factors such as the shape of the bag, complicated shapes of an inflator attaching port and the bag are not shown. An example of the structure used for the bag portion 10 is shown in FIG. 2 and examples of the structure used for the fastened portion are shown in FIGS. 13 to 18. FIG. 19 shows an example of a side-imp act protection hollow-woven air bag attached to a vehicle body.

Method of Measuring Crimp Ratio and Method of Calculating Rate of Variation

The crimp ratio of yarns of unrolled fabric was measured in conformity with JIS-L-1096(8.7.2). Since the weave structure in the bag portions in all of samples is the same, by employing the sample used in Example 1, sampling was made and measurement was conducted. To calculate the rate of variation in the crimp ratio, the crimp ratio of 10 warps in the fastened portion of each of the samples of Examples and Comparative Examples was measured and the average value of the measurement values was obtained. According to the rate between the average value in the bag portion (X) as a reference and that in the fastened portion (Y)(|(X−Y)/X|×100=%), the rate of variation of the crimp ratio of the warps of the fabric for forming the side-impact protection hollow-woven air bag was calculated.

Method of Measuring Thickness and Method of Calculating Rate of Variation

In conformity with JIS-L-1096 (under pressure of 240 g/cm$^2$), the thickness in ten positions in the width direction of each of the bag portion and the fastened portion in the base fabric for the side-impact protection hollow-woven air bag was measured. The rate of variation in thickness is expressed as the rate between the thickness in the bag portion (X) as a reference and that in the fastened portion (Y)(|(X−Y)/X|×100=%).

Method of Evaluation of Crease and Crimp

Crease and crimp were evaluated by an appearance test in a gray fabric state during a manufacturing process of the basic fabric for forming the side-impact protection hollow-woven air bag and an appearance test after the process. Ability of coating w as evaluated by the performance of the bag when the finished fabric is coated and the product acceptance ratio. Over-all judgment was made on the basis of the quality of the base fabric including the weaving performance and the quality of the bag as a final product.

Example 5

Nylon 66 filament yarns of 350 dtex/108f were used as warps and wefts were used to form a base fabric by plain weave by employing an air jet loom having an electronic jacquard machine so that a double bag portion has 60 warps/2.54 cm and 60 wefts/2.54 cm by hollow weave. After that, the resultant woven fabric was subjected to a boiling water shrinking process and, subsequently, drying and setting processes, thereby forming a finished fabric. The bag portion in FIG. 12 showing the sample is a double bag portion, and the fastened portion has a structure in which a fastened portion is formed in the bag portion structure.

Example 6

Nylon 66 filament yarns of 350 dtex/108f were used as warps and wefts were used to form a base fabric by plain weave by employing an air jet loom and an electronic jacquard machine so that a double bag portion has 60 warps/2.54 cm and 60 wefts/2.54 cm by hollow weave. After that, the resultant woven fabric was subjected to a boiling water shrinking process and, subsequently, drying and setting processes, thereby forming a finished fabric. The bag portion in FIG. 12 showing the sample is a double bag portion, and the fastened portion has a structure using a (3×3) satin structure.

Example 7

Nylon 66 filament yarns of 350 dtex/108f were used as warps and wefts were used to form a base fabric by plain weave by employing an air jet loom and an electronic jacquard machine so that a double bag portion has 60 warps/2.54 cm and 60 wefts/2.54 cm by hollow weave. After that, the resultant woven fabric was subjected to a boiling water shrinking process and, subsequently, drying and setting processes, thereby forming a finished fabric. The bag portion in FIG. 12 showing the sample is a double bag portion, and the fastened portion has a structure using a (7×7) basket.

Example 8

Nylon 66 filament yarns of 350 dtex/108f were used as warps and wefts were used to form a base fabric by plain weave by employing an air jet loom and an electronic jacquard machine so that a double bag portion has 60 warps/2.54 cm and 60 wefts/2.54 cm by hollow weave. After that, the resultant woven fabric was subjected to a boiling water shrinking process and, subsequently, drying and setting processes, thereby forming a finished fabric. The bag portion in FIG. 12 showing the sample is a double bag portion, and the fastened portion has a structure using a (5×5) basket structure.

Comparative Example 4

Nylon 66 filament yarns of 350 dtex/108f were used as warps and wefts were used to form a base fabric by plain weave by employing an air jet loom and an electronic jacquard machine so that a double bag portion has 60 warps/2.54 cm and 60 wefts/2.54 cm by hollow weave. After that, the resultant woven fabric was subjected to a boiling water shrinking process and, subsequently, drying and setting processes, thereby forming a finished fabric. The bag portion in FIG. 12 showing the sample is a double bag portion, and the fastened portion has a structure using a (2×2) basket structure.

Comparative Example 5

Nylon 66 filament yarns of 350 dtex/108f were used as warps and wefts were used to form a base fabric by plain weave by employing an air jet loom and an electronic jacquard machine so that a double bag portion has 60 warps/2.54 cm and 60 wefts/2.51 cm by hollow weave. After that, the resultant woven fabric was subjected to a boiling water shrinking process and, subsequently, drying and setting processes, thereby forming a finished fabric. The bag portion in FIG. 12 showing the sample is a double bag portion, and the fastened portion has a structure using a (3×3) basket structure.

In Example 6, the rate of variation in the crimp ratio between the warps in the bag portion and the fastened portion is slightly higher than that of Example 5. Example 6 is interior to Example 5 with respect to the weaving performance, however, since the rate of variation in thickness in the width direction of the base fabric for forming the side-impact protection hollow-woven air bag is low, the flatness of the base fabric is excellent. The number of defects such as crease is small, and the post-treatment can be also excellently performed. Since the base fabric is flat, the coatability is good. As a result, the quality of the side-impact protection hollow-woven air bag is high.

In Examples 7 and 8, the rate of variation in the crimp ratio between the warps is relatively high. Examples 7 and 8 are therefore interior to Example 5 with respect to the weaving performance, however, the level of warp loosening does not deteriorate the weaving performance so much. Although the rate of variation in thickness in the width direction of the base fabric for forming the side-impact protection hollow-woven air bag is higher than that of Example 5, the crease at the weaving stage can be suppressed within a certain range. Since the thickness of the base fabric varies, the coatability is slightly lower as compared with Examples 5 and 6. However, it does not deteriorate the coatability.

In Comparative Examples 4 and 5, as obviously understood from Table 2, the rate of variation in thickness in the width direction of the base fabric for forming the side-impact protection hollow-woven air bag is high. Consequently, creases occurred at the stage the fabric was taken up by a core, and the quality was lowered. Also at the time of post-treatment, a flare of the selvage become rough, the workability deteriorates, and the quality deteriorates. Moreover, the rate of variation in the crimp ratio between the warps is high, the warps are loosened, and the weaving performance largely deteriorates. Since the quality of the

TABLE 2

|  | Thickness (mm) | | | Crimp ratio (%) | | | Gray fabric (the number/100 m) | | Finished fabric (the number/100 m) | | Coatability | Over-all judgment |
| --- | --- | --- | --- | --- | --- | --- | --- | --- | --- | --- | --- | --- |
|  | Bag portion | Fastened portion | Rate of variation (%) | Bag portion | Fastened portion | Rate of variation (%) | Crease | Crimp | Crease | Crimp | | |
| Example 5 | 0.537 | 0.531 | 1.1 | 9.3 | 9.4 | 1 | 1 | 0 | 1 | 0 | very good | very good |
| Example 6 | 0.537 | 0.543 | 1.1 | 9.3 | 10.7 | 15 | 1 | 1 | 1 | 1 | very good | good |
| Example 7 | 0.537 | 0.526 | 2.0 | 9.3 | 11.3 | 22 | 1 | 1 | 2 | 1 | good | good |
| Example 8 | 0.537 | 0.523 | 2.6 | 9.3 | 12.6 | 35 | 2 | 2 | 3 | 2 | so-so | so-so |
| Comparative Example 4 | 0.537 | 0.517 | 3.7 | 9.3 | 14.3 | 54 | 5 | 2 | 7 | 2 | bad | bad |
| Comparative Example 5 | 0.537 | 0.520 | 3.2 | 9.3 | 13.8 | 48 | 3 | 2 | 5 | 2 | bad | bad |

As obviously understood from Table 2, in Example 5, the rate of variation in thickness of the base fabric for forming the side-impact protection hollow-woven air bag is low, the rate of variation in the crimp ratio of warps is very low, so that flatness of the base fabric for forming the air bag was achieved and the number of defects at the stage of gray fabric was decreased. Further, since the post-treatment was excellently performed, an increase in the number of defects in the finished fabric is low. Since the crimp ratio of the warps is almost equal to that in the bag portion, warps are not loosened, and the weaving performance is very high. The coatability is also excellent. As a result, the quality of the side-impact protection hollow-woven air bag is high.

finished fabric is low, the possibility that a problem occurs during coating is high. As a result, the quality of the side-impact protection hollow-woven air bag is accordingly low.

Example 9

Nylon 66 multi-filament yarns of 350 dtex/108f were used as warps and wefts and woven by plain weave to form a bag portion (1 in FIG. 1) having 60 warps/2.54 cm and 60 wefts/2.54 cm by hollow weave by employing an air jet loom and an electronic jacquard machine. After that, the resultant woven fabric was subjected to a boiling water shrinking process and, subsequently, drying and setting processes, thereby forming a processed fabric. In a border portion (2 in FIG. 1) of the sample shown in FIG. 18, two lines having a structure in which warps and wefts are interlaced in the order opposite to that of the end line of a portion (portion A) which is not inflated when an air bag is operated were inserted. FIG. 18 shows an example of the structure of the portion 2 in FIG. 1 at this time.

Table 3 shows the result of evaluation of the characteristics.

TABLE 3

| | Opening at the margin between the single layer and double layer (mm) | Quantity of airflow (L/cm2/min) | Quality of bag |
|---|---|---|---|
| Example 9 | 1.8 | 3.8 | good |

With respect to Example 9 as well, in a manner similar to Examples 1 to 4, it is understood that the elongation amount is small and the air permeability is low. Consequently, when the air bag is inflated, reduction in air leak from the fastened portion B as the boundary portion between the bag portion and the fastened portion A can be achieved.

What is claimed is:

1. A base fabric for a hollow-woven air bag, comprising:
   a bag portion formed by connecting a plurality of cloth pieces by hollow weaving;
   a single layer that is interwoven by a yarn A connected to said bag portion; and
   a single layer that is interwoven by a vain B of a weave structure different from that of said single layer that is interwoven by a yarn A, which is formed in a boundary portion between said bag portion and said single layer that is interwoven by a yarn A,
   wherein the weave structure of the single layer that is interwoven by a yarn B has warps and/or wefts of at least one line existing in a boundary face with the bag portion interlaced in the order opposite to that of an end line of the bag portion.

2. A base fabric for a hollow-woven air bag, comprising,
   a bag portion formed by connecting a plurality of cloth pieces by hollow weaving;
   a single layer that is interwoven by a yarn A connected to the bag portion; and
   a single layer that is interwoven by a yarn B of a weave structure different from that of said single layer that is interwoven by a yarn A, which is formed in a boundary portion between said bag portion and said single layer that is interwoven by a yarn A,
   wherein the weave structure of said single layer that is interwoven by a yarn B has warps and/or wefts of at least two lines existing in a boundary face with the single layer that is interwoven by a yarn A interlaced in the order opposite to that of the end of an single layer that is interwoven by a yarn A.

3. A base fabric for a hollow-woven air bag, comprising,
   a bag portion formed by connecting a plurality of cloth pieces by hollow weaving;
   a single layer that is interwoven by a yarn A connected to the bag portion; and
   a single layer that is interwoven by a yarn B of a weave structure different from that of said single layer that is interwoven by a yarn A, which is formed in a boundary portion between said bag portion and said single layer that is interwoven by a yarn A,
   wherein a yarn of an upper fabric and a yarn of a lower fabric which form said bag portion have a weave structure in which said yarns of the upper and lower fabrics are crossed with each other at least once in such a manner that said yarn of the upper fabric passes under said yarn of the lower fabric and said yarn of the lower fabric passes over said yarn of the upper fabric.

4. A base fabric for a hollow-woven air bag, comprising
   a bag portion formed by connecting a plurality of cloth pieces each made by warps and wefts by hollow weaving,
   wherein a rate of variation in a crimp ratio of all of said warps is 40% or less.

5. The base fabric for a hollow-woven air bag according to claim 4, wherein a rate of variation in thickness in the width direction of said base fabric for an air bag is 3% or less.

6. The base fabric for a hollow-woven air bag according to claim 4, wherein a rate of variation in a crimp ratio of all of said warps is 30% or less.

7. The base fabric for a hollow-woven air bag according to claim 4, wherein a rate of variation in a crimp ratio of all of said warps is 15% or less.

8. The base fabric for a hollow-woven air bag according to claim 4, wherein a rate of variation in a crimp ratio of all of said warps is 10% or less.

9. An air bag comprising
   a base fabric for an air bag for forming a bag portion, and
   an inflator attaching port provided for said bag portion,
   wherein said base fabric for an air bag comprises:
      said bag portion formed by connecting a plurality of cloth pieces by hollow weaving;
      a single layer that is interwoven by a yarn A connected to said bag portion; and
      a single layer that is interwoven by a yarn B of a weave structure different from that of said single layer that is interwoven by a yarn A, which is formed in a boundary portion between said bag portion and said single layer that is interwoven by a yarn A,
   wherein the weave structure of the single layer that is interwoven by a yarn B has warps and/or wefts of at least one line existing in a boundary face with the bag portion interlaced in the order opposite to that of an end line of the bag portion.

10. An air bag comprising
   (a) a base fabric for an air bag for forming a bag portion, and
   (b) an inflator attaching port provided for the bag portion,
   wherein the base fabric for an air bag comprises:
      the bag portion formed by connecting a plurality of cloth pieces by hollow weaving;
      a single layer that is interwoven by a yarn A connected to the bag portion; and
      a single layer that is interwoven by a yarn B of a weave structure different from that of said single layer that is interwoven by a yarn A, which is formed in a boundary portion between said bag portion and said single layer that is interwoven by a yarn A,
   wherein the weave structure of said single layer that is interwoven by a yarn B has warps and/or wefts of at least two lines existing in a boundary face with the single layer that is interwoven by a yarn A interlaced in the order opposite to that of an end line of the single layer that is interwoven by a yarn A.

11. An air bag comprising, (a) a base fabric for an air bag for forming a bag portion, and (b) an inflator attaching port provided for the bag portion, wherein the base fabric for an air bag comprises:

the bag portion formed by connecting a plurality of cloth pieces by hollow weaving;

a single layer that is interwoven by a yarn A connected to the bag portion; and a single layer that is interwoven by a yarn B of a weave structure different from that of said single layer that is interwoven by a yarn A, which is formed in a boundary portion between said bag portion and said single layer that is interwoven by a yarn A, wherein a yarn of an upper fabric and a yarn of a lower fabric which form said bag portion have a weave structure in which said yarns of the upper and lower fabrics are crossed with each other at least once in such a manner that said yarn of the upper fabric passes under said yarn of the lower fabric and said yarn of the lower fabric passes over said yarn of the upper fabric.

12. An air bag comprising (a) a base fabric for an air bag for forming a bag portion and an inflator attaching portion provided for said bag portion, wherein said base fabric for an air bag comprises:

said bag portion formed by connecting a plurality of cloth pieces each made by warps and wefts by hollow weaving, wherein a rate of variation in a crimp ratio of all of said warps is 40% or less.

13. The air bag according to claim 12, wherein a rate of variation in thickness in the width direction of said base fabric for an air bag is 3% or less.

14. The air bag according to claim 12, wherein a rate of variation in a crimp ratio of all of said warps is 30% or less.

15. The air bag according to claim 12, wherein a rate of variation in a crimp ratio of all of said warps is 15% or less.

16. The air bag according to claim 12, wherein a rate of variation in a crimp ratio of all of said warps is 10% or less.

17. A side-impact protection air bag comprising:

(a) a base fabric for an air bag for forming a bag portion; and (b) an inflator attaching port provided for said bag portion, wherein said base fabric for an air bag comprises said bag portion formed by connecting a plurality of cloth pieces made by warps and wefts by hollow weave, and a rate of variation in crimp ratio of all of said warps is 40% or less.

18. The side-impact protection air bag according to claim 17, wherein a rate of variation in thickness in the width direction of the base fabric for an air bag is 3% or less.

19. The base fabric for a hollow-woven air bag according to claim 1, wherein said single layer that is interwoven by a yarn B has 1 to 20 warps and/or wefts.

20. The base fabric for a hollow-woven air bag according to claim 2, wherein said single layer that is interwoven by a yarn B has 1 to 20 warps and/or wefts.

21. The air bag for a hollow-woven air bag according to claim 9, wherein said single layer that is interwoven by a yarn B has 1 to 20 warps and/or wefts.

22. The air bag for a hollow-woven air bag according to claim 10, wherein said single layer that is interwoven by a yarn B has 1 to 20 warps and/or wefts.

* * * * *